March 10, 1936.  H. C. EDDY  2,033,419

ELECTRIC TREATER FOR EMULSIONS

Filed Oct. 2, 1934

INVENTOR:
HAROLD C. EDDY,
ATTORNEY.

Patented Mar. 10, 1936

2,033,419

UNITED STATES PATENT OFFICE 2,033,419

ELECTRIC TREATER FOR EMULSIONS

Harold C. Eddy, Los Angeles, Calif., assignor to Petroleum Rectifying Company of California, Los Angeles, Calif., a corporation of California Application October 2, 1934, Serial No. 746,496

5 Claims. (Cl. 204—24)

My invention relates to a novel electric treater particularly applicable to the treatment of emulsions.

It is an important object of the present invention to provide a novel means for establishing an artificial surface of conducting liquid in an electric treater, as distinct from the usual surface of water or other conducting liquid in one end of the treater. It is often difficult to definitely ascertain the position of the surface of conducting liquid, thus giving rise to adverse treating conditions. In the present invention the position of the surface of conducting liquid is very definitely known, and can be easily maintained in a desired position.

It is a further object of the invention to provide a surface of conducting liquid, the position of which is definitely controllable.

Furthermore, in an electric dehydrator containing emulsion constituents undergoing gravitational separation, the concentration of the conducting liquid varies throughout the height of the tank, and it is often difficult to definitely determine or regulate the exact position of the surface of the body of conducting liquid such as water. Immediately above such a surface is often formed a body of loose emulsion which has a very high water content. It has been proposed to use this surface of water or other conducting liquid as an electrode, but some difficulty has been encountered due to the body of loose emulsion immediately above this surface, such treaters being sometimes quite critical in operation.

It is an object of the present invention to provide a surface of conducting liquid which is not decreased in effectiveness due to a body of loose emulsion immediately thereabove. In the present invention this surface of conducting liquid can be continuously washed or renewed to remove at least a portion of the loose emulsion which might otherwise tend to accumulate thereadjacent.

Such a definitely controllable surface of conducting liquid can be used in many capacities. Thus, shifting of this surface can be made to control field intensities or the concentration of a conducting liquid present in the emulsion undergoing treatment in fields thereadjacent or spaced therefrom. One of the most desirable capacities in which such a liquid surface can be used involves the establishing of an electric field in the form of a blast directed toward this surface, the surface acting as one electrode.

It is one of the objects of the present invention to provide a treater in which the blast discharge takes place to a definitely controllable surface of conducting liquid so that the coalesced particles move toward and beneath this surface to be very effectively separated.

It is a further object of the invention to provide an electric treater including a cup means in which some of the conducting liquid can accumulate, and from which excessive quantities of the conducting liquid can overflow.

It is a further object of the invention to establish an artificial surface of conducting liquid which can, if desired, be closer to the electrode means than the surface of the conducting liquid otherwise present in the treater.

It is a further object of the invention to provide a novel adjustment means for controlling the relative positions of such surfaces inside and outside of the cup means.

Further objects and advantages of the invention will be made evident hereinafter.

Referring to the drawing.

Figure 1:
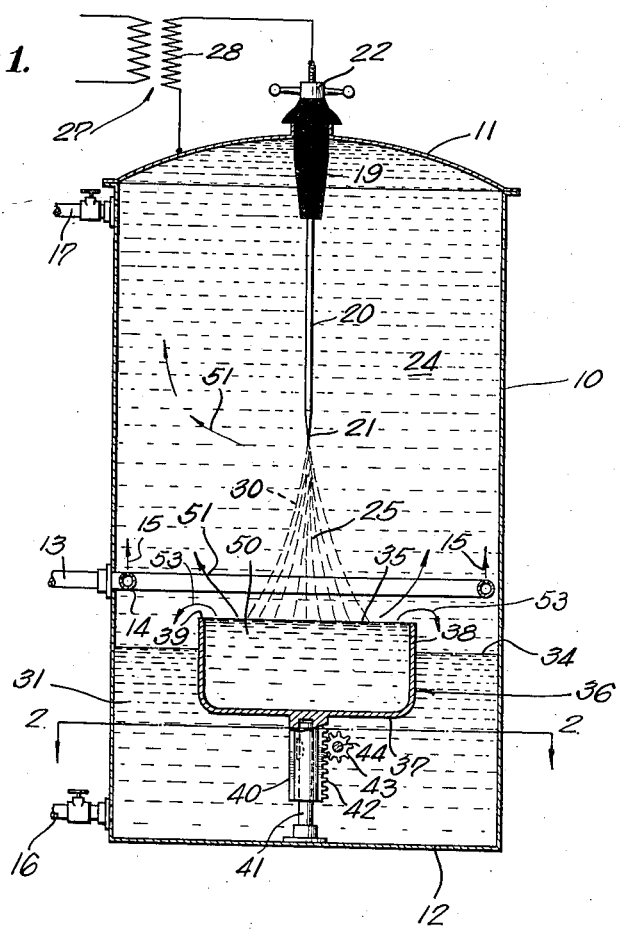
Fig. 1 is a vertical sectional view of one embodiment of the invention.
Figure 2:
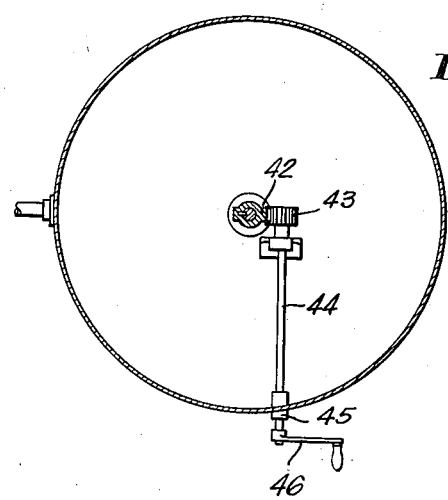
Fig. 2 is a horizontal sectional view taken on the line 2—2 of Fig. 1.

In the embodiment illustrated the treater of my invention includes a tank 10 closed at its upper end by a dome 11, and at its lower end by a lower wall 12. Emulsion is introduced into this tank by any suitable means such as a pipe 13 connected to an annular spray pipe 14 directing the incoming emulsion upward as indicated by the arrows 15. One of the phase-liquids can be withdrawn from the lower end of the tank through a pipe 16, while the other of the phase-liquids can be withdrawn from the upper end of the tank through a pipe 17, suitable valves being provided in these pipes.

Extending through the dome 11 is a bushing 19 which supports an electrode means which may take the form of a rod 20 providing a lower terminal portion 21 which is relatively sharp. This rod may be so formed as to be vertically movable relative to the bushing 19. If desired the upper end of this rod may be threaded into a nut 22 engaging the upper end of the bushing 19 so that by rotating this nut, the vertical position of the terminal portion 21 is adjusted. Any suitable potential-supply means may be used for building up an electric field in a treating space 24 between the electrode 20 and the tank 10 and in a space 25 below the terminal portion of the electrode. In the embodiment illustrated this potential-supply means is in the form of a transformer 27 providing a secondary winding 28, one side of which is grounded to the tank and the other side of which is connected to the electrode 20.

The field established in the treating space 24 is highly concentrated around the electrode 20 due to the fact that this electrode is of much smaller size than the tank 10. A major portion of the coalescing action which takes place in this field is thus effected in the zone immediately around the electrode 20. The coalesced particles of water, for instance, forming the dispersed phase of the emulsion, move downward along the electrode 20 due to two actions. In the first place, the difference in density between these particles and the remainder of the emulsion constituents will cause this downward flow. In the second place, there is established adjacent the terminal portion 21 a very intense electric blast indicated by dotted lines 30. This blast takes place from the terminal portion 21 due to the relatively sharp nature thereof and serves as a pump or propelling means acting to force the coalesced particles downward. This field in the space 25 also exerts an auxiliary or supplementary coalescing action, and in some instances it is possible to exclusively utilize this blast-type field for both coalescing and propelling the conducting particles toward the lower end of the treater.

If such a treater is preliminarily filled with dry oil, and emulsion is then forced through the pipe 13, the coalesced particles will eventually drop to the lower end of the tank to form a mass of conducting material 31. Similarly, the other phase-liquid, usually oil, will rise to the upper end of the tank and form a corresponding mass of relatively non-conducting liquid. In treating certain emulsions there is a tendency to form a body of loose emulsion between these masses of conducting and relatively non-conducting material. This body of loose emulsion will tend to accumulate above the surface of the mass of conducting material indicated by the numeral 34. With other emulsions, however, there is little tendency for this loose emulsion to be formed.

In the absence of other structure the blast discharge will tend to take place to the surface 34. If, however, the body of loose emulsion accumulates above the surface 34 there is a tendency for the action of the treater to be rather critical. Further, it is very difficult for the operator to know the exact position of the level 34, especially if a body of loose emulsion is present immediately thereabove. The position of this surface 34 is often very critical if attempts are made to extend the blast to this surface.

In the present invention I establish an artificial or auxiliary surface of conducting liquid indicated by the numeral 35. This may be accomplished by the use of a cup means 36 shown as including a bottom wall 37 and a side wall 38, the latter terminating in an upper lip 39. Preferably this cup means is mounted so as to be vertically movable. In the embodiment illustrated a shank 40 can extend downward from the cup means 36, providing an opening in which a pin 41 slidably extends, a suitable means being provided, such as the key shown, to prevent turning of the cup means. This shank may provide a rack 42 on one side thereof, and a pinion 43 secured to a shaft 44 may be used for controlling the vertical position of the cup means. This shaft may extend to the exterior of the tank 10 through a suitable stuffing box 45 and may carry a crank 46 or other means for adjusting the vertical position of the cup means. A suitable scale may be provided on the exterior of the tank adjacent the crank 46 so that the operator will know the exact position of this cup means.

With such a system, the cup means 36 may be either preliminarily filled with water or other conducting liquid or will accumulate a body of conducting liquid as treatment progresses. As indicated, it is usually desirable to completely fill the cup means with a body of conducting liquid, this body of liquid being indicated by the numeral 50 and providing the surface 35 previously described. If this cup means is positioned in spaced relationship with the terminal portion 21 the electric blast will take place as shown, and the conducting particles will be moved downward due to the two actions mentioned above. Both of these actions tend to move the conducting particles into the body of conducting material 50 to effectively separate these conducting particles from the other phase-liquid, such as oil, which rises to the upper end of the tank as indicated by the arrows 51. This tends to increase the amount of conducting liquid in the cup 36, but as soon as the cup is completely filled, the excess liquid will overflow as indicated by the arrow 53 and will enter the zone around the cup means 36. This outward flowing conducting liquid in effect washes or renews the surface 35 and prevents the accumulation thereadjacent of excessive quantities of loose emulsion, thus presenting to the blast a very clean surface of conducting liquid. The downward moving particles of coalesced conducting material readily move through this surface, though any particles of oil will not be moved therethrough but will rise as indicated by the arrows 51.

It will further be apparent that the position of the surface 35 will be dependent upon the position of the cup means 36. Thus, the operator always knows the position of this surface, knowing the position of the crank 46 or indicating means used in conjunction therewith. The result is that a very stable treating action can be maintained.

The position of the surface 34 is not critical with the system shown. Usually, however, it is preferable to maintain this level below the level 35 so that the desirable action above described will be obtained.

The relative positions of the levels 34 and 35 can be changed either by proper manipulation of the valves in the pipes 16 and 17 or by adjustment of the position of the cup means 36, or by both. Further, the vertical position of the blast relative to the tank can be changed by adjusting the position of the cup means 36 or by changing the position of the electrode 20, or by changing the position of both of these elements. This system also permits introduction of the incoming emulsion into various parts of the field. By shifting the fields upward, the emulsion will be introduced at a lower portion than would be the case if the fields are shifted downward.

It should not be understood, however, that I am limited to the use of a point electrode. Other electrodes may be used, as, for example, an electrode of substantial surface area or an electrode made of pipe left open at its lower end regardless of whether or not the terminal edge thereof is blunt or sharpened to form an annular edge. However, the downward velocity imparted to the conducting particles will be slower if a relatively sharp terminal portion is not used. However, the cup means 36 still finds utility in the combination regardless of whether or not an electric blast is used, for the coalesced particles will drop downward of their own weight and will become associated with the body of liquid 50 in the cup means 36. A very definite surface of conducting liquid will thus always be maintained.

Nor is the treater limited to emulsions of oil and water. In some instances other emulsions can be successfully treated, even those emulsions in which a conducting liquid forming the dispersed phase is of lower density than the material forming the continuous phase. In the latter event the position of the electrode 20 and the cup means 36 will be reversed. The cup means will still accumulate a body of the conducting liquid and will form a surface 35.

Nor is it always necessary that the surface 35 be used as an electrode. The cup arrangement shown finds utility with various types of electrode systems positioned in spaced relationship thereto even though no field is established to this surface.

Various changes and modifications will be apparent to those skilled in the art, and the embodiment herein disclosed in detail has been selected only for illustrative purposes.

I claim as my invention:

1. In combination in an electric treater for emulsions containing two constituent phase-liquids, the dispersed phase-liquid being of a conducting nature: a tank containing masses of said phase-liquids undergoing separation; a cup partially submerged in the phase-liquid of a conducting nature in the bottom of said tank, said cup providing an upper annular lip extending above the mass of conducting phase-liquid; means for introducing emulsion into said tank; and electric means for treating said emulsion to coalesce said dispersed phase-liquid, the coalesced phase-liquid moving downward toward said cup means, said cup means filling with a body of said conducting phase-liquid and overflowing any excess of said conducting phase-liquid into the mass of conducting phase-liquid in the bottom of said tank; and means for separately withdrawing said phase-liquids from said tank.

2. In combination in an electric treater for emulsions containing a dispersed phase of a conducting liquid: a tank containing a mass of said conducting liquid in one end thereof; a cup means only partially submerged in said mass of said conducting liquid and containing a body of said conducting liquid providing a surface positioned closer to the other end of said tank than the surface of said mass of conducting liquid around said cup means whereby additional conducting liquid reaching said cup means will overflow into the zone around said cup means containing said mass of conducting liquid; means for introducing emulsion into said tank; and means for establishing an electric field in said tank to coalesce the dispersed phase of said emulsion, the coalesced material moving toward said surface of said body of conducting liquid in said cup means.

3. A combination as defined in claim 5 in which said means for establishing said electric field includes an electrode spaced from said surface of said conducting liquid in said cup means and providing a relatively sharp terminal portion extending toward said surface but spaced therefrom, and includes a potential-supply means developing a sufficient potential difference between said surface and said electrode to establish an electric blast adjacent said terminal portion tending to force the particles of conducting liquid toward and into said body of conducting liquid in said cup means, the excess conducting liquid overflowing from said cup means into said zone therearound which contains said mass of conducting liquid.

4. A combination as defined in claim 2 including means for relatively shifting the positions of the surfaces of said conducting liquid in said cup means and in said zone around said cup means.

5. In combination in an electric treater for emulsions: a tank containing treated emulsion constituents undergoing separation, said treated constituents including a body of the dispersed phase liquid in one end of said tank and a body of loose emulsion thereadjacent; a cup in said tank in the path of travel of coalesced particles of said dispersed phase liquid, said cup providing an annular lip terminating in said body of loose emulsion and being smaller than said tank to provide an annular space between said cup and said tank whereby when said cup becomes full of said dispersed phase liquid the excess overflows into said annular space and moves beyond said annular lip to reach said body of dispersed phase liquid; means for establishing an electric field in said tank; and means supplying emulsion to be treated to said tank.

HAROLD C. EDDY.